United States Patent [19]
Beck et al.

[11] 3,748,027
[45] July 24, 1973

[54] AUDIO-VISUAL METHOD AND APPARATUS
[75] Inventors: James E. Beck, Glenview; Edward J. Ho, Buffalo Grove, both of Ill.
[73] Assignee: Bell & Howell Company, Chicago, Ill.
[22] Filed: Oct. 22, 1971
[21] Appl. No.: 191,668

[52] U.S. Cl................. 352/17, 352/20, 352/22
[51] Int. Cl. ............................................ G03b 31/04
[58] Field of Search .................. 352/15, 16, 17, 19, 352/20, 22

[56] References Cited
UNITED STATES PATENTS
| | | | |
|---|---|---|---|
| 2,679,187 | 5/1954 | Bitting | 352/17 |
| 2,892,900 | 6/1959 | Guttewein | 352/17 X |
| 3,259,010 | 7/1966 | Mindell | 352/17 X |
| 3,620,609 | 11/1971 | John | 352/17 |

*Primary Examiner*—Samuel S. Matthews
*Assistant Examiner*—Michael L. Gellner
*Attorney*—William K. Serp, John E. Peele et al.

[57] ABSTRACT

A motion picture camera generates a synchronization signal related to the rate of film transport through the camera. The synchronization signal is translated to a higher frequency and mixed with an audio signal. The composite signal is recorded upon the tape of a monaural recorder. During playback, the synchronization signal is separated from the audio signal and translated down in frequency. The translated synchronization signal is compared with a similar signal generated by the projector and the resultant signal utilized to control the speed of the projector.

7 Claims, 2 Drawing Figures

AUDIO-VISUAL METHOD AND APPARATUS

BACKGROUND

This invention generally relates to an apparatus for providing a film display accompanied by an audio presentation and more particularly relates to such an apparatus wherein the audio accompaniment is recorded upon a medium separate from the film.

Various arrangements have been suggested for providing a sound accompaniment synchronized with a motion picture film presentation. A particularly well accepted system includes a specially constructed cassette tape recorder wherein the tape provies an audio track as well as a control track. The control track carries informational signals utilized to stop the recorder at the desired point during the presentation and a synchronization signal for synchronizing the projected film image with the audio accompaniment. In such systems, the camera includes a pulse generator which provides a pulsed synchronization signal related to the rate of travel of the film through the projector. After a short period of time, the recorder is actuated and a film exposure light located in the camera exposes a portion of the margin of the film to produce a recorder start signal. Upon deactuation of the camera, the synchronization signal from the camera is interrupted and a stop signal is recorded upon the control track as the recorder coasts to a stop.

During projection, the recorder start signal created by exposing a portion of the film margin during filming is sensed by a photocell which serves to actuate the recorder. The synchronization pulses recorded upon the control track are played back and compared with similar pulses generated by the projector. The resultant signal is used to control the speed of the projector so as to maintain synchronization between the audio accompaniment and the projected image. At the end of the sound related scene, a stop signal previously recorded upon the control track of the cassette tape is sensed and utilized to turn off the recorder temporarily until occurrence of the start signal for the next sound scene. A particular disadvantage with such a system is that it requires a relatively complex, specially constructed tape recorder. Such a recorder necessarily includes dual channels for recording the audio signal upon an audio track and the control signals upon a control track. The illustrated embodiment overcomes this disadvantage by providing an apparatus for recording sound accompaniment for a film display which permits the use of a conventional monaural-recorder.

It is a main object of this invention to provide an apparatus for recording and playing back an audio accompaniment for a motion picture film display. Other objects and advantages of this invention will be apparent from the description of the accompanying drawings in which:

RECORDING

Figure 1:
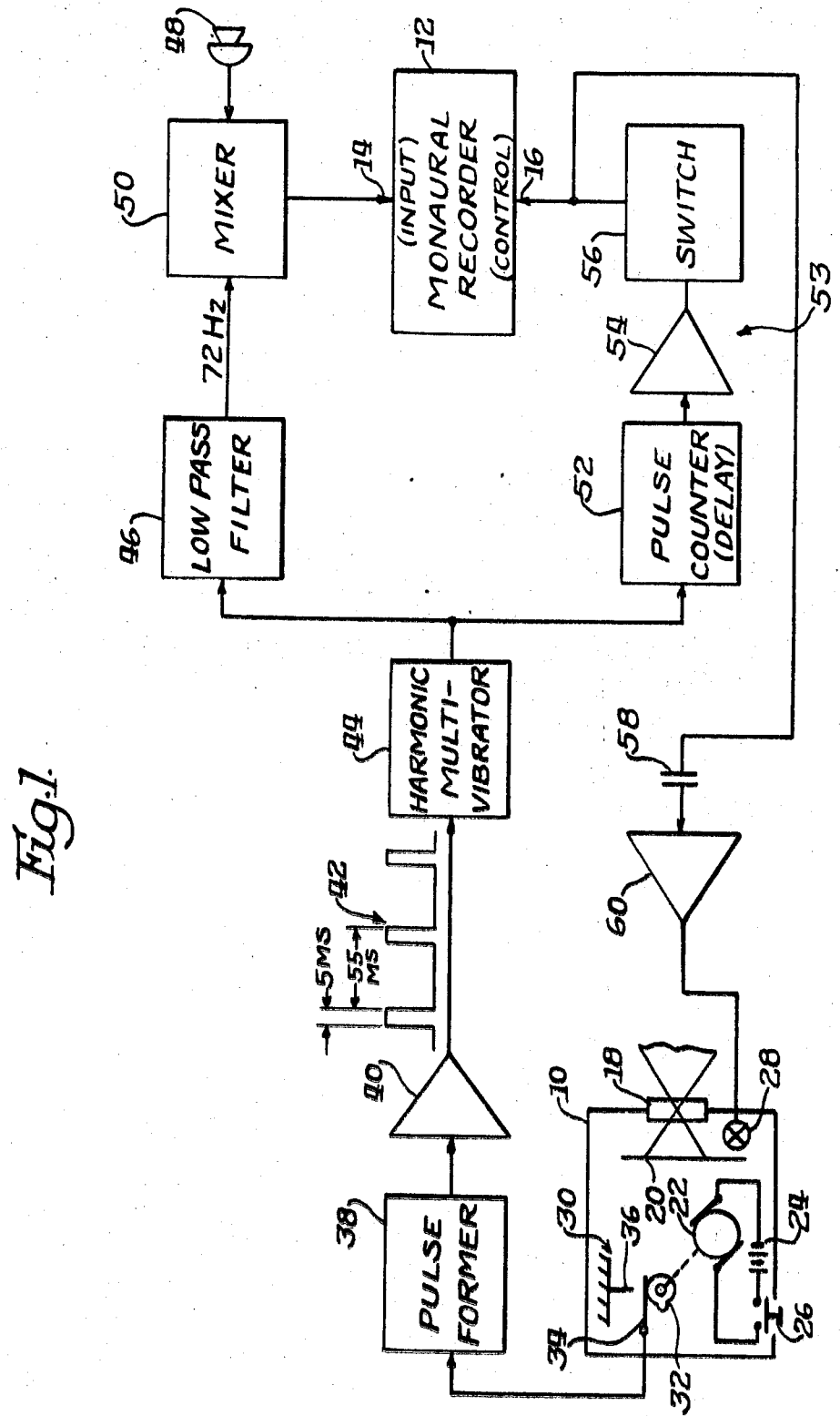
FIG. 1 is a schematic block diagram of an apparatus for exposing a film and preparing a synchronized audio accompaniment for the film.

With particular reference to FIG. 1, the filming and recording apparatus briefly includes a modified motion picture camera 10, and a conventional monaural recorder 12 having an audio input 14 and a control input 16 which are usually combined in the microphone connector. The remaining components illustrated in FIG. 1 serve to synchronize the operation of the monaural recorder 12 with the camera 10 so that the audio information recorded upon the tape in the recorder may be reproduced in synchronization with the subject being filmed. The remaining components illustrated may be conveniently contained within a single container and serve as a recording control module.

The camera 10 includes a projection lens 18 and a film 20 which is drawn across the projection lens for exposure by means of a film drive motor 22. The film drive motor 22 is energized by a battery 24 which is selectively connected to the motor terminals through a push button camera actuation switch 26. Serving to expose a portion of the margin of the film 20 so as to provide a start signal for the recorder is a signal exposure light 28. The signal exposure light 28 is connected to the recording module in a manner to be hereinafter further described. Coupled to the camera motor 22 and generating a pulsed synchronization signal related to the quantity of film transported through the camera is a pulse generator 30 which includes a rotary cam 32 coupled to the motor 22. The rotary cam 32 periodically urges the leaf 34 against a grounded contact 36. Conventional 8mm motion picture camera systems utilize a film transport rate of approximately 18 frames per second, and for purposes of discussion this particular frame rate will be considered as exemplary. However, it should be noted that various other film transport rates may be used without departing from the spirit and scope of this invention. The synchronization signal from the pulse generator 30 is fed to a pulse former 38 which assures that the pulse shape from the camera 10 will be a square wave suitable for processing by the remaining circuit components in the recording module. The output of the pulse former 38 is passed through an amplifier 40. The output of the amplifier 40 as illustrated at 42, is in the form of 5 milliseconds square-wave pulses repeated at approximately 55 milli-second intervals.

The spaced pulses corresponding to a camera frame rate of approximately 18 frames per second are fed into a harmonic multi-vibrator 44. The harmonic multi-vibrator 44 is a conventional mono-stable multi-vibrator whose period is selected to obtain the maximum amount of fourth harmonic output. To obtain this maximum fourth harmonic output the "on" period is set to 1/5 of the 55 millisecond interval or approximately 11 milliseconds. The harmonically rich output of the multi-vibrator 44 is passed through a low-pass filter 46 to obtain the desired sine-wave output signal of 72 hertz. Serving to mix the 72 hertz control signal with audio information provided by a microphone 48 is a resistive mixer 50. The output of the mixer 50 is fed to the audio input 14 of the monaural-recorder for recording on the tape within the recorder 12. It will be appreciated that the microphone 48 characteristics are such that the lower frequencies in the audio-range below 200 hertz are eliminated so that the audio components are not generally contained within the spectural range of the 72 hertz synchronization signal.

The output of the harmonic multi-vibrator 44 is also fed into a pulse counter 52. The pulse counter 52 is part of a switching means 53 which serves to delay the start of the monaural-recorder 12 in response to actuation of the camera 10 to permit the camera 10 to compensate for recorder coast time during playback. This delay feature assures synchronization between the audio information and the exposed image on the film. The pulse counter 52 after counting approximately 18 pulses, which corresponds to a 1 second delay, provides a control signal which is amplified by an amplifier 54 and then applied to a switch 56. The switching means 53 serves a dual function; firstly, it serves to actuate the monaural-recorder 12 to commence recording of the accompanying composite audio-synchronization signal and secondly, the control signal momentarily actuates the exposure of light 28 mounted in the camera. The output of the switch 56 is coupled through a capacitor 58 to the input of an amplifier 60 and then to the signal light 28 for energization thereof. The coupling capacitor 58 permits a surge to pass to the light 28 upon closure of the switch 56 yet prevents continued energization of the signal light. Under normal conditions the signal light 28 will be energized for a period of time sufficient to expose the film margin for a single frame. Thus, any excessive light which may affect the image area of the film will be limited in duration and will not substantially affect the projected image.

In operation, the camera switch 26 is depressed energizing the motor 22 thereby causing the film 20 to be transported across the camera exposure apparatus. The signal generator 30 generates a pulse for each film frame. The pulses are formed, amplified and fed to the harmonic multi-vibrator 44. The harmonically rich output of the multi-vibrator is passed through the low-pass filter 46 and the sinusoidal output thereof is mixed with the microphone output and fed to the input jack of the recorder 14. The composite signal is recorded upon the single track of the monaural-recorder 12. Upon the expiration of approximately 18 frames, the pulse counter 52 actuates the switching means 53 thus turning on the recorder and momentarily energizing the exposure light 28 within the camera 10. Thus, a recorder start signal is placed on the film which is available during projection to turn on the recorder. Upon release of the camera switch 26 the pulse signal input to the pulse counter 52 is interrupted. In response to cessation of the pulse rate, the switching means 53 is actuated interrupting operation of the recorder 12 which coasts to a stop.

PLAYBACK

Figure 2:
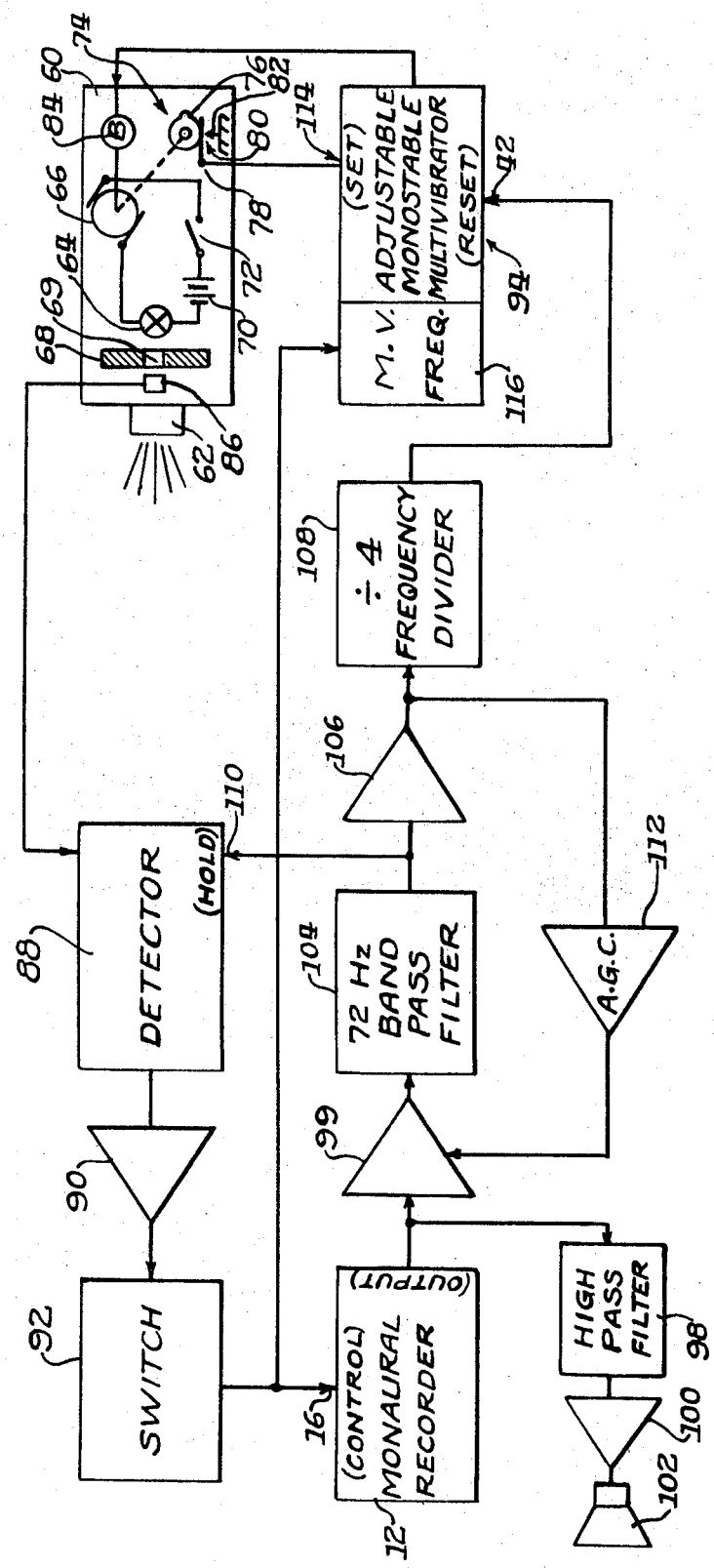
FIG. 2 is a schematic block diagram of an apparatus for projecting the film and playing back the audio accompaniment prepared with the apparatus of FIG. 1.

With particular reference to FIG. 2, the illustrated apparatus includes the recorder 12 which is preferably the same recorder as used during recording of the original audio tape with the controls placed in the playback mode of operation. A projector 60 is included having a projection lens 62 and lamp 64 for projecting the film image. The projector further includes a drive motor 66 coupled to a developed film 68 the margin of which carries a recorder start signal. The drive motor 66 is in series with the projection light 64, a battery 70 and a single pole switch 72. The projector motor 66 is also coupled to a pulse generator 74 comprising a cam 76 riding upon the leaf 78 of a switch 80. The leaf 78 is periodically urged by the cam 76 against a grounded contact 82. Serving to regulate the speed of the projector motor 66 is a brake 84 controlled in a manner to be hereinafter further described. Positioned adjacent the margin of the film 68, and serving to sense the presence of the recorder start signal 69 is a photocell 86. The remaining circuitry illustrated in FIG. 2 may be housed in a single case descriptively termed a playback module.

The output of the photocell 86 is fed to one input of a detector 88 which receives a signal from the photocell in the presence of the recorder start signal 69. The output of the detector 88 is fed through an amplifier 90 to a switch 92. The switch 92 performs a two-fold purpose. It serves to actuate the monaural-recorder 12 so as to start the recorder in response to the detection of a start signal upon the film. Secondly, as will hereinafter be further described, the switch 92 controls the frequency of an adjustable monostable multi-vibrator 94. The audio output of the recorder 12 is fed to a high-pass filter 98 having a cut-off frequency of two-hundred cycles thereby presenting a high impedance to the seventy-two hertz control signal previously recorded upon the track of the recorder. The output of the high-pass filter 98 is fed through an amplifier 100 to a speaker 102 which provides the audio accompaniment for the film presentation. The composite signal from the recorder is also fed through an amplifier 99 to a 72 hertz band-pass filter 104 which removes the audio component therefrom. The output of the 72 hertz band-pass filter 104 is fed through an amplifier 106 to a frequency divider 108 which translates the signal by dividing the 72 hertz signal by four to a repetition rate of 18 hertz. This rate corresponds to the rate of the signal originally generated by the camera 10 previously described. The output of the band-pass filter 104 is fed to a hold input 110 of the detector 88, thus maintaining the detector "on" to prevent turn-off of the recorder 12 upon expiration of the start signal provided by the photocell 86. Serving to maintain the signal to the band-pass filter constant thus assuring a signal level acceptable to the playback module circuitry is an automatic gain-control amplifier 112. The automatic gain amplifier controls the gain of the input band-pass amplifier 99 by feeding a portion of the output signal of the amplifier 106 to the gain control of the amplifier 99.

The output of the frequency divider 108 is fed to the reset input 42 of the adjustable mono-stable multi-vibrator 94 the alternate set input 114 being fed by the pulse generator 74 in the projector 60. The output of the adjustable mono-stable multi-vibrator 94 is fed to the brake 84 in the projector which serves to control the speed of the projector motor 66 to maintain the projected image in synchronization with the audio accompaniment. The multi-vibrator 94 is of conventional construction and further includes a means 116 for varying its natural frequency. The natural frequency of the multi-vibrator 94 is selected by the switch 92. During synchronized operation, the multi-vibrator frequency is adjusted for a natural frequency of 15 hertz per second. Since the nominal frequency of the input signals to the multi-vibrator are 18 hertz per second, the multi-vibrator will be controlled by the set and re-set signals provided respectively from the frequency divider 108 and the pulse generator 74 within the projector 60. In the event a synchronization pulse from the recorder has been lost, due to noise, a defective tape or any other condition, the multi-vibrator 94 will reset automatically thus compensating for the lost synchronization pulse. When all pulses are present, the multi-vibrator 94 acts as a conventional bistable multi-vibrator. During operation of the recorder 12, the multi-vibrator 94 serves to compare the control signals from the recorder 12 with the pulse signals generated by the projector 60 and maintains the two signals in synchronization by adjusting the projector motor brake 84. As previously mentioned, termination of the control signal from the recorder 12 actuates the switch 92 thereby stopping the operation of the recorder 12.

Further, in response to actuation of the switch 92, the multi-vibrator frequency is shifted to 18 hertz per second and the multi-vibrator operates as a mono-stable multi-vibrator. In this operational mode the multi-vibrator is set by the pulse generator 74 in the projector and automatically reset so as to maintain the projector speed constant at a rate of 18 frames per second.

In operation, the film 68 is threaded through the projector 60 and a previously recorded monaural tape is placed in the recorder. The projector is started and the switch 92 holds the mono-stable multi-vibrator 94 to a natural frequency of 18 frames per second. The pulse generator 74 sets the multivibrator which automatically resets at a rate of 18 frames per second maintaining the speed of the projector 60 constant. Upon the sensing of the exposed area 69 along the margin of the film 68 the photocell 86 triggers the detector 88 which causes the switch 92 to actuate the monaural-recorder 12 and switch the multi-vibrator 94 to a natural frequency of 15 hertz per second. The audio portion of the composite signal from the recorder 12 is fed to the loud speaker 102 and the synchronization signal is filtered from the composite signal by means of the band-pass filter 104. The synchronization signal is fed to a frequency divider 108 which converts the 72 hertz signal to a nominal pulse rate of 18 frames per second. The 18 frames per second pulse rate sets the mono-stable multi-vibrator 94 which is reset by the pulse generator 74 in the projector 60. The output of the multi-vibrator controls the brake 84 so as to maintain the speed of the projector 60 in synchronization with the recorder 12. In the event a control signal from the recorder is lost the multi-vibrator 94 will reset thus supplying the missing control pulse.

While this invention has been particularly shown and described with reference to a preferred embodiment thereof it will be understood by those skilled in the art that various changes in form and detail can be made without departing from the spirit and scope of the invention.

What is claimed is:

1. In an audio-visual apparatus including a motion picture camera having a film drive for transporting the film across an exposure aperture and a recorder, the improvement comprising:
   a signal generator coupled to the motion picture camera film drive for generating a synchronization signal related to the rate of film drawn across the camera aperture;
   means for providing an audio signal;
   switching means coupled to said synchronization signal and to the recorder for actuating the recorder in response to said synchronizational signal;
   exposure means for exposing a portion of the film, said exposure means being energized by said switching means for operation in response to actuation of the recorder thereby recording a signal on said film in response to the actuation of the recorder;
   a mixer receiving said synchronization signal and said audio signal, the output of said mixer being coupled to the recorder to provide a composite signal for recording thereby; and
   means for translating the frequency of said synchronizing signal to an alternate frequency prior to mixing with the audio signal.

2. The apparatus of claim 1 wherein said switching means includes delay means for actuating the recorder and said film exposure means upon expiration of a predetermined delay after the commencement of said synchronizing signal.

3. In an audio-visual apparatus including a motion picture camera having a film drive for transporting the film across an exposure aperture and a recorder, the improvement comprising:
   a signal generator coupled to the motion picture camera film drive for generating a synchronization signal related to the rate of film drawn across the camera aperture;
   means for providing an audio signal;
   a mixer receiving said synchronization signal and said audio signal, the output of said mixer being coupled to the recorder to provide a composite signal for recording thereby;
   means for translating the frequency of said synchronizing signal to an alternate frequency prior to mixing with the audio signal; and
   switching means responsive to said synchronization signal for actuating the recorder in response to said synchronizing signal.

4. The apparatus of claim 3 which further includes means for exposing a portion of the film said exposure means being energized by said switching means for operation in response to the actuation of the recorder thereby recording an indication on said film in response to the actuation of the recorder.

5. The apparatus of claim 4 wherein said switching means includes delay means for actuating the recorder and said film exposure means upon expiration of a predetermined delay after the commencement of said synchronizing signal.

6. An apparatus for providing a film presentation synchronized with an audio accompaniment comprising:
   a recorder supplying a synchronization signal and an audio signal;
   a motion picture film projector;
   sensing means for sensing a control signal carried by the film passing within said motion picture projector;
   switching means responsive to said film sensing means for actuating said recorder in response to the control signal carried by the film;
   said switching means being responsive to said synchronization signal from said recorder for maintaining said recorder operative during the presence of said synchronization signal,
   said projector including generating means providing a film signal related to the rate of film passing through the projector, means for controlling the rate of film passing through the projector and comparison means for comparing the synchronization signal with said film signal and controlling the rate of travel of the film through the projector so as to synchronize the audio signal from said recorder with the film presentation; and said comparison means includes a multi-vibrator the output of which controls said film rate control means thereby regulating the speed of the film passing through the projector and means for varying the frequency of said multi-vibrator, said frequency varying means being connected to said switching means so that the frequency of said multi-vibrator is varied in response to the presence of said synchronizing signal.

7. The apparatus of claim 6 which further includes a frequency translator connected between said recorder and said multi-vibrator for translating said control signal to an alternate frequency.

* * * * *